United States Patent [19]
Guimier et al.

[11] Patent Number: 6,054,839
[45] Date of Patent: Apr. 25, 2000

[54] PORTABLE ELECTRONIC DEVICE, ITS HOUSING AND ITS BATTERY COMPARTMENT

[75] Inventors: Stéphane P. Guimier, Yvre L'Eveque; Pascal A. R. Jean, Mulsanne, both of France

[73] Assignee: U.S. Philips Corporation, New York, N.Y.

[21] Appl. No.: 09/348,921

[22] Filed: Jul. 6, 1999

[30] Foreign Application Priority Data

Jul. 7, 1998 [FR] France ................................. 98 08694

[51] Int. Cl.$^7$ ....................................................... H02J 7/00
[52] U.S. Cl. ............................................. 320/113; 320/107
[58] Field of Search .................................. 320/113, 107; 429/96, 97, 98, 99, 100

[56] References Cited

U.S. PATENT DOCUMENTS 5,604,050   2/1997   Brunette et al. ........................ 429/100
5,689,824  11/1997   Nagai ........................................ 429/97
5,857,148   1/1999   Weisshappel et al. ...................... 320/2

OTHER PUBLICATIONS

Patent Abstracts of Japan JP–A 08186515, Date of Publication: Jul. 16, 1996.

*Primary Examiner*—Edward H. Tso
*Assistant Examiner*—Lawrence Luk

[57] ABSTRACT

The device (1) for supplying electric power by battery (5) is formed by a housing (2) having electronic circuits (3), a separable battery compartment (4) and connection means (8) between circuits and battery enabling to simultaneously put two batteries in place. According to the invention, the connection means (8) form a separate interface between housing and compartment; plug-in means (11) may simultaneously firmly attach at least two compartments to the connection means and pivoting means (8) are provided on the housing (2) to enable an at least sectorial rotation of the connection means (8) and of the compartment(s) which is (are) plugged into the connection means to the housing (2). Application to a mobile telephone handset.

9 Claims, 3 Drawing Sheets

PORTABLE ELECTRONIC DEVICE, ITS HOUSING AND ITS BATTERY COMPARTMENT

DESCRIPTION

1. Field of the Invention

The present invention relates to a portable electronic device with battery power supply, formed by a housing holding electronic circuits, a separable battery compartment including a battery and connection means for electrically connecting said electronic circuits to said battery, these means being designed to enable the simultaneous connection of at least two batteries.

The invention is applied to any type of portable device, preferably small, and having a low electric power consumption. This may be, for example, a reader of magnetic cassette tapes of a portable radio cassette recorder, a small radio receiver, a portable personal computer or, advantageously, a portable radio communication device whether it is a wireless telephone handset (or residential) or a mobile telephone handset (also called mobile or cellular telephone).

2. Background of the Invention

For such electronic devices, especially for portable radio communication devices, the batteries pose the problem of limited useful life, because these devices are ever more miniaturized and the battery is also miniaturized in comparable proportions, and also because these devices continue to consume power in the standby mode between outgoing calls for the purpose of being located and being able to receive a call.

In practice, the batteries are not used to full capacity. The users have the tendency to replace the battery before it is empty to avoid that it is finally discharged during a telephone conversation. Consequently, the effective operating time may be shorter than that announced by the manufacturer. To make matters worse, the fact that the batteries of a mobile are recharged before they are completely empty reduces their useful life.

If the battery reaches the end of charge during a conversation, the telephone stops operating. In order to continue the conversation, the user has no other choice but to replace the battery, turn on the telephone again, enter his code again, wait for the registration and dial the number again or hope that the remote called party will call him again. This causes delay, if not the loss of communication with the called party and, depending on the contract made with the operator, the possible payment of a charge for a new call.

For resolving this technical problem, two types of solutions may be considered: electronic solutions and electromechanical solutions. The purely electronic solutions imply a complication in the programming of the telephone network and of the associated mobiles and, in most cases, they cannot but cause an interruption of the conversation of the order of several seconds, which is highly annoying for the speakers.

The electromechanical solutions which consist of enabling the simultaneous temporary connection of two batteries provide the advantage of not interrupting the telephone conversation, as the device is permanently supplied with power, and also of not having to modify the electronic circuits or their programming when the battery is expected to be changed. Among these solutions is notably known that of the patent application of Japan JP-A 08186515 according to which the battery compartment has two lower conducting side ribs which co-operate with two side slots on the back of the housing of the handset which are also conducting. The used battery is replaced by inserting a new battery into the slots on one side of the housing and slide it inward which causes the used battery to be ejected on the other side, provided that the new battery is put in place against the housing. This technique is simple, but it implies a technology that is hard to implement and thus costly, both for the housing of the handset and for the battery compartments.

It is an object of the invention to realize connection means between the battery and the electronic circuits of a mobile, which connection means enable the simultaneous connection of two compartments, which embodiment is easy to use and thus economic while it is reliable and resistant to shocks.

SUMMARY OF THE INVENTION

This object is achieved and the drawbacks of the prior art are mitigated thanks to the fact that the portable electronic device defined in the opening paragraph is characterized in that said connection means form a separate interface between said housing and said compartment, in that plug-in means are provided for simultaneously attaching at least two compartments firmly against said connection means and in that pivoting means are provided on said housing to enable at least a sectorial rotation of said connection means and of said compartment(s) which is (are) plugged into the connection means to said housing.

According to a preferred embodiment, the portable electronic device according to the invention is characterized in that the connection means are formed by a cylinder with alternate insulating rings and conductors, rotatably mounted against an edge of the housing and which co-operates by its conducting rings with sliding electrical contacts slightly protruding to the exterior of the housing and of the compartment(s).

Preferably, the edge against which the cylinder can turn is the lower edge on the back of the housing.

When a battery is nearly completely discharged, it can be taken out of the housing even during a conversation by making it turn around the cylinder sector by sector, then stick another charged battery into the cylinder, draw the discharged battery out and finally push the charged battery home against the housing with a turn that is reverse to the preceding one. During all these operations, the device remains in function because it is being permanently supplied with power, whether it relates to the standby mode or during a conversation, this with respect to a mobile.

According to another preferred embodiment, the portable electronic device according to the invention is characterized in that said connection means are formed by a hollow cylindrical body rotatably mounted against an edge of said housing, having a first longitudinal opening through which a flat cable of conductors runs coming from inside said housing across a second large enough opening made opposite the first opening in this housing at the location of said edge of said housing and in that said body has on the inside conducting tracks arranged around the circumference and having each at least two contacts showing through the surface at the location of openings intended to receive as electrical contacts showing through the surface of the compartment and angularly substantially less than 90 degrees apart.

This second embodiment is distinguished from the first embodiment because of the fact that it does not use sliding contacts. As regards the changing of the battery, in this case the handling is comparable to that which is described above for the first embodiment. It will furthermore be noted that the same compartment comprising two plug-in pins in the cylinder or the cylindrical body and typically four contacts showing through the surface may be used for the two embodiments cited above.

The simultaneous parallel connection of two batteries for the power supply of an electronic device may pose the additional technical problem that the charged battery discharges into the discharged battery during the time of the common connection which may last several dozen seconds or even several minutes. To avoid this unwanted discharge, there may be provided that each battery compartment comprises at least one diode called anti-return diode) to inhibit the discharging of a battery into another battery during the time when two battery compartments are simultaneously put into said device.

BRIEF DESCRIPTION OF THE DRAWINGS

These and other aspects of the invention will be apparent from and elucidated with reference to the embodiments described hereinafter.

In the drawings:

FIGS. 1 to 6 represent a first embodiment and FIGS. 7 to 9 a second embodiment of the electronic device according to the invention, in this case a mobile telephone handset, FIG. 1 represents in a perspective view the device seen from the back with the compartment locked onto the housing, FIG. 2 represents the device of FIG. 1 of which the compartment is raised by a pivoting action, FIG. 3 represents in a perspective and cut-away view the housing, the compartment and the cylinder of the device of FIG. 1, FIG. 5 represents the device as shown in FIG. 1 in which two compartments are plugged in simultaneously, FIG. 6 represents the device of FIG. 5 after compartments have been pivoted against the housing.

DESCRIPTION OF PREFERRED EMBODIMENTS

Figure 1:
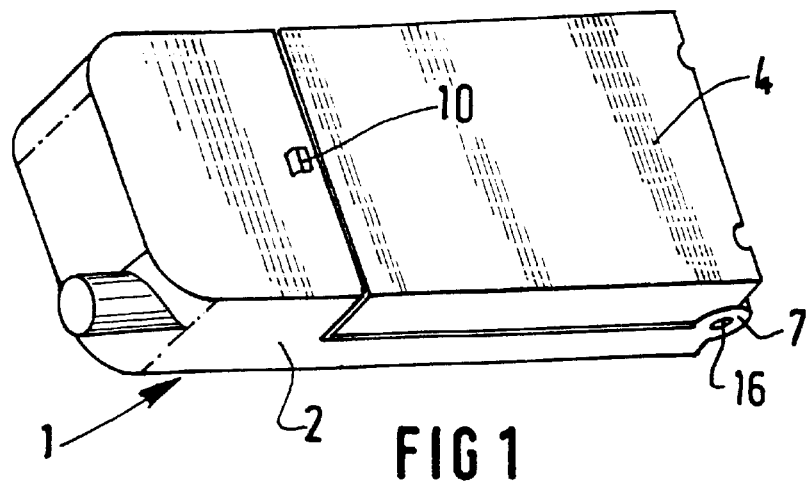
Figure 2:
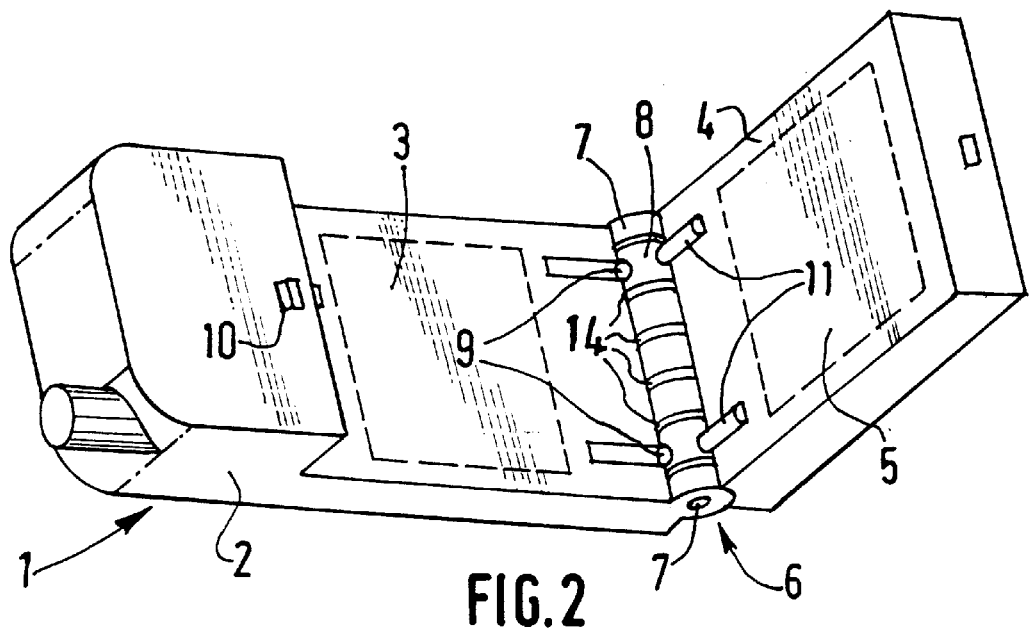

The handset of mobile 1 of FIG. 1 comprises a housing 2 which envelops electronic circuits 3 (see FIG. 2), and a battery compartment 4 containing one battery 5 (see FIG. 2). In FIG. 1 the battery compartment is held in place against the housing by means of a known type of lock 10.

In FIG. 2 the compartment 4 has been unlocked and turned through 90° against the lower edge 6 on the back of the housing which rotatably supports in lugs 7 a cylinder 8 in holes 9 of which the compartment 4 is anchored by means of pins 11 which form plug-in means. It will be noted that at each of certain predetermined sides along its axis, the cylinder has several holes 9 regularly spaced apart, so that it is possible to plug-in various compartments simultaneously and that thus various batteries simultaneously supply the device with power.

In the Figures, the holes are represented angularly spaced by 90 degrees and each compartment that is put in place in the cylinder also has an angular space of 90 degrees. However, this sectorial angle could be smaller as is the case for the second embodiment (FIGS. 7 and 8) by bevelling the lower face of the compartment and could be lowered to a value of the order of 45 degrees. It will be noted that a still smaller angle than 45° could render the cylinder fragile and would not be necessary given the fact that it is sufficient to plug in and simultaneously connect two compartments to implement the invention.

Figure 3:
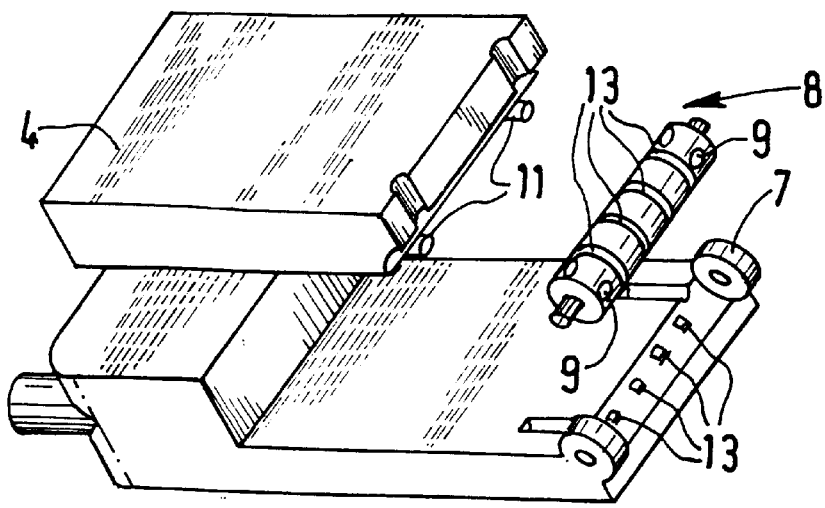

The connection means between the battery 5 and the electronic circuits 3 are formed by contacts, typically 4, in the form of elastic blades showing through the surface which run across and slightly protrude from the outer surface of the joining parts referenced 12 in the compartment (FIG. 4A) and 13 in the joining part (FIG. 3). The cylinder 8 serves as an electromechanical relay in the form of a separate interface between the contacts 12 and 13. Therefore, mutually insulated conducting bushes (or rings) 14 are each in sliding contact with counter part contacts 12 and 13.

Figures 4A, 4B:
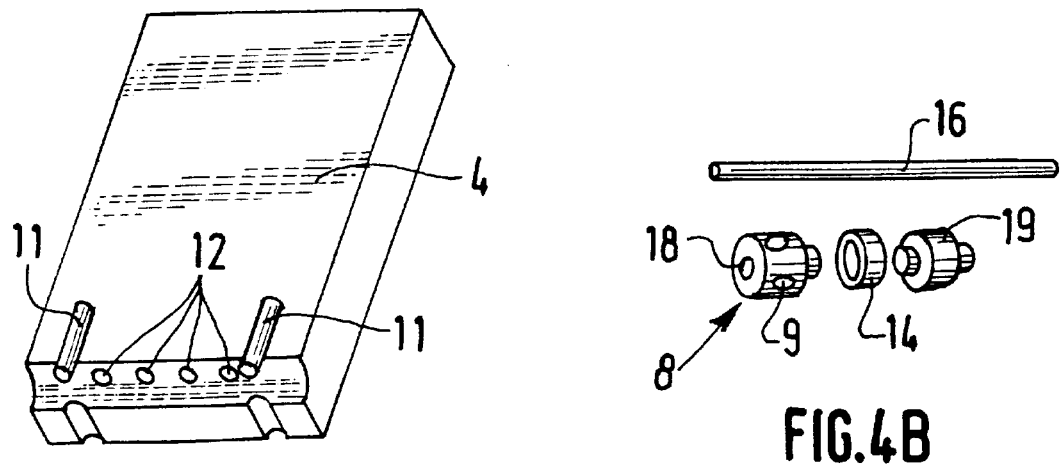
FIG. 4A is a perspective view from below of the compartment and FIG. 4B a perspective view of certain elements separated from the cylinder.

An example of embodiment of the cylinder 8 is represented in FIG. 4B: insulating rings such as 18, 19 and the bushes 14 are alternately slid onto a shaft 16. The bushes themselves are supported by the insulating rings, the assembly being slightly tightened and the ends of the shaft 16 being rotatably supported in a central hole of the circular lugs 7. The rings 18 and 19 may be made of an Acrylate Butadiene Styrene Polycarbonate (ABS-PC) mixture just like the molded joining parts of the housing and of the compartments. The contacts 12 and 13 and the bushes 14 are made of a well-conducting metal and not subject to oxidation of a type known in the field of mobile telephony.

Figure 5:
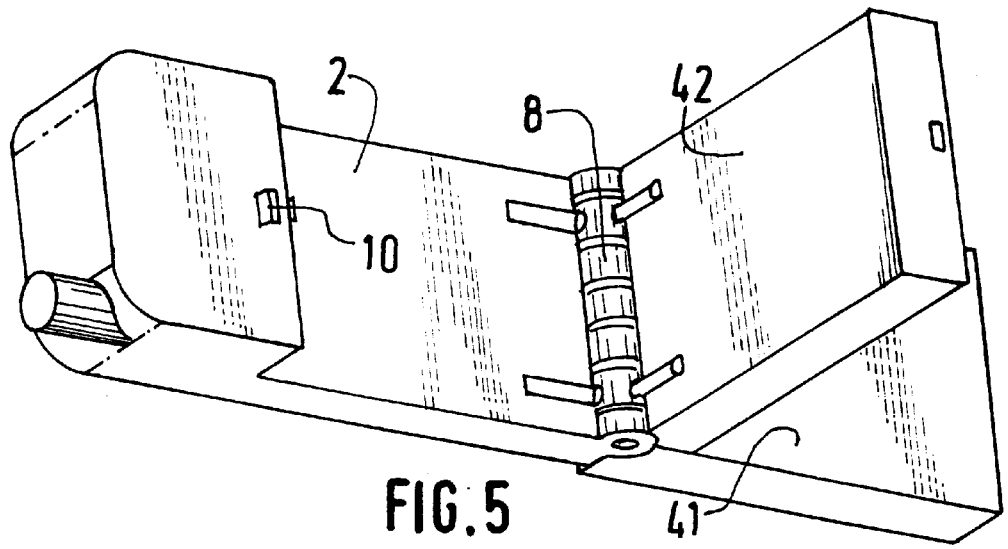
Figure 6:
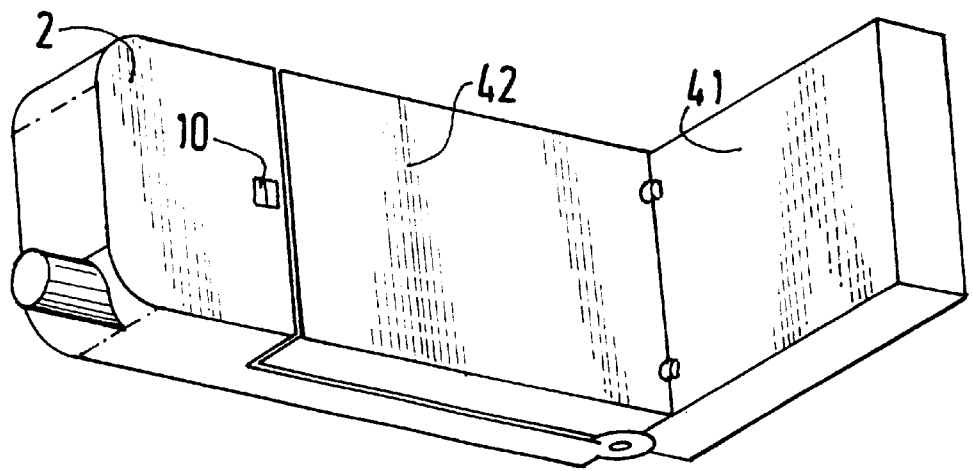

The replacement of a discharged battery 41 by a charged battery 42 after a warning by a signal transmitted by the handset may be effected as follows: the handset being in the position of FIG. 1 is opened up to the position of FIG. 5, while the compartment 41 has pivoted by 180 degrees. Then, thanks to the holes 9 in the cylinder 8, the new charged battery 42 is pushed forwards at an angle relative to the battery 41. Then the assembly of the two batteries is folded in the direction of the housing until the battery 42 is locked against the housing by means of the lock 10 (FIG. 6); finally the battery 41 is taken out. It will be noted that there are other ways to proceed which bring the same result, that is, maintaining the electrical power supply during the exchange of the batteries: for example, a new battery 42 is pushed backwards at an angle relative to the battery 4 (respectively 41) which is supposed to be empty, into the cylinder of the device represented in FIG. 1; then the battery 42 is unlocked and the assembly is pivoted through 15 to 20 degrees, sufficiently for the upper part of the battery 4 (41) to come clear of the housing; this battery (41) is then extracted and the new battery (42) is locked up against the housing again.

Figure 7:
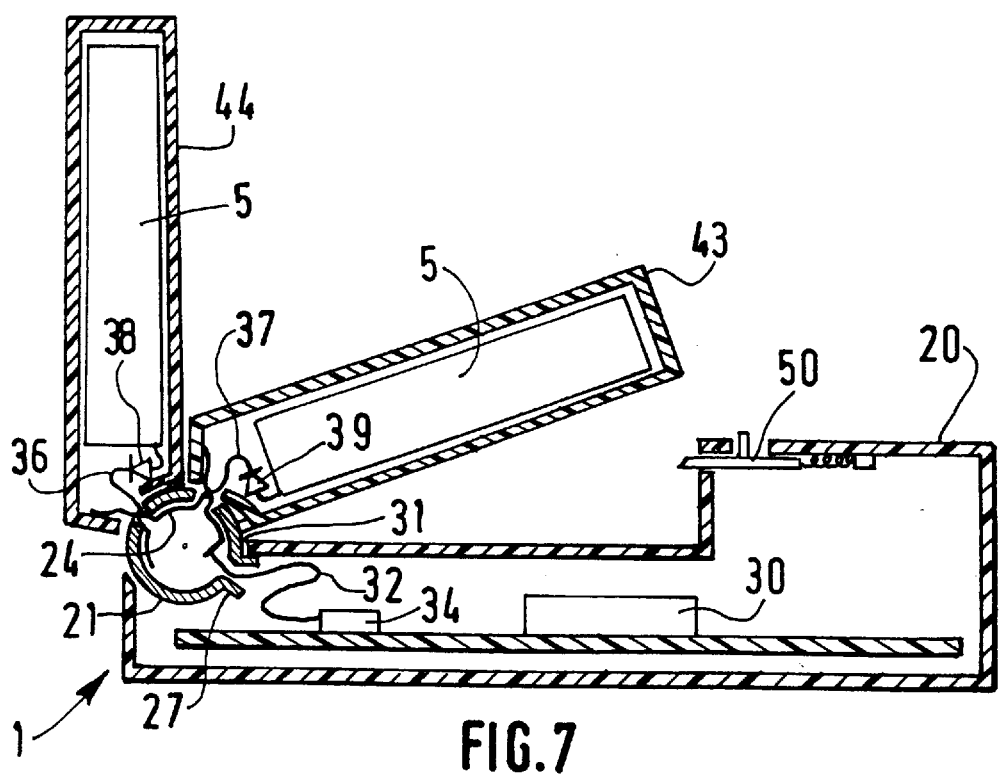
FIG. 7 is a cross-sectional side view of the second embodiment of the device having two compartments in an opening configuration.
Figure 8:
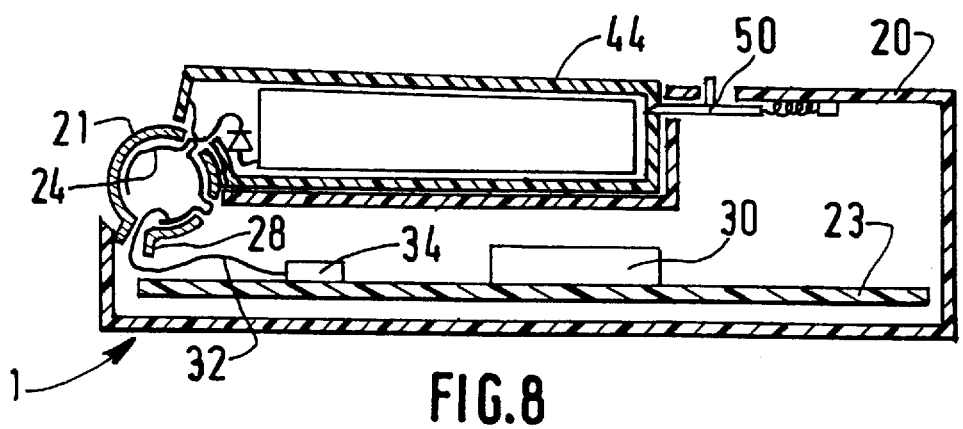
FIG. 8 is a cross-sectional side view of the second embodiment of the device in which the discharged battery has been removed and the new charged battery has been folded against the housing.
Figure 9:
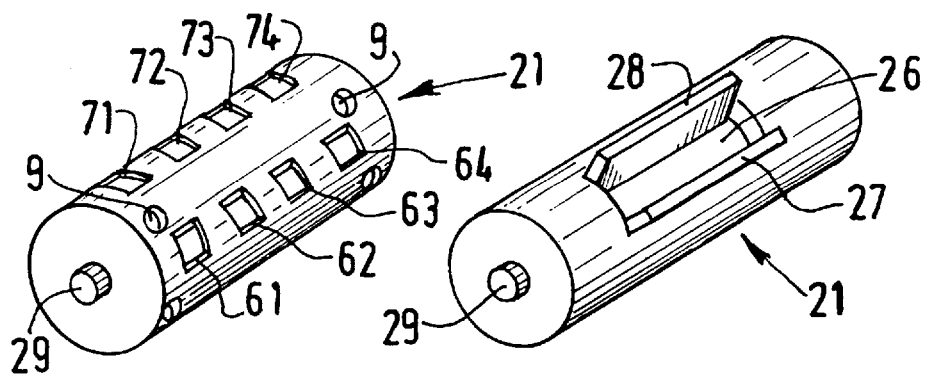
FIG. 9 is a perspective view along two positions of the hollow cylindrical body used by the second embodiment.

The second embodiment of the FIGS. 7 to 9 features the particularity of not using sliding contacts, contrary to the first embodiment. In consequence, whereas the cylinder 8 of the first embodiment rotates freely, the hollow cylindrical body 21 replacing it in the second embodiment is subjected to a rotation in sectors, while the maximum angle of rotation is of the order of 90 degrees in either direction.

In FIGS. 7 and 8 the housing 20 which has a lock 50 for a compartment 43 (44 respectively) and electronic circuits 30 on a printed circuit board 23 comprises, according to the invention, the hollow cylindrical body 21 which forms a separate interface between the housing 20 and the compartment(s) 43, 44. The body 21 represented in FIG. 9 comprises, on one side, two sets of (typically) 4 openings each disposed along a generatrix, the openings 61, 71; 62, 72; 63, 73; 64, 74 corresponding in pairs along planes perpendicular to the axis of the cylinder. Each opening leaves one electrical contact to pass in the form of an elastic blade which shows through the outer surface of the cylinder. Each pair of contacts forms part of an inner conducting track along the circumference such as 24 (FIGS. 7 and 8) and each contact of a pair of openings 63, 73 is intended to meet a counterpart contact of the contacts such as 12 (see FIG. 4A) of a battery compartment. The compartments 43 and 44 may be nearly identical to the compartments 4, 41 and 42 of the first embodiment; they comprise pins 11 (not shown) to be inserted into holes 9 of the hollow body (see FIG. 9). The difference is made by the fact that their lower surface is slightly beveled and that their hold around the circumference of the hollow body 21 is only of the order of 75 degrees. On the opposite side to the one that has the openings for the electrical contacts, the hollow body 21 has a longitudinal opening 26 with two longitudinal lips 27 and 28. The hollow body 21 is put in place by inserting axial pins 29 into the lugs (not shown) such as 7 of the housing (see FIG. 1), so that the lips 27 and 28 stick out through an opening 31 (not clearly shown in the Figures) over a length that is adapted to the opening 26. Thus, the lips 27 and 28 form edges against the inside walls of the housing 20 and enable the hollow body to have an angular displacement of the order of 90°. While the hollow body is being mounted, the (4) tracks 24 are rigidly contacted to as many conductors that form a flat cable 32 which passes between the lips 27, 28 and is connected to the contact studs of a connector 34 inside the housing.

FIG. 7 represents the housing 20 of the mobile having two compartments; the compartment 43 whose battery is discharged and which one has just lifted by about 15 degrees until the lip 28 stops against the housing, and the compartment 44 with its charged battery, which one has just put into the hollow body 21. To change from the configuration of FIG. 7 to the configuration of nominal operation of FIG. 8, the compartment 43 has been extracted and the compartment 44 has been turned against the housing 20 until it is blocked by means of a lock 50, in which position the lip 27 stops against the housing 20 on its lower part.

It will be noted in FIG. 7 that one of the supply conductors 36 (37, respectively) coming from the battery has a diode 38 (39, respectively). This corresponds to a preferred variant of the invention, furthermore applicable to the two embodiments described with respect to inhibiting that the charged battery (compartment 44) discharges into the discharged battery (compartment 43) during the time when the two batteries are connected simultaneously. In this case it is the diode 39 that realizes the blocking of the undesired charging current. The diode such as 38 or 39 may be found on the positive pole (as represented) or on the negative pole (with an inverse polarization) of the power supply and it is evident that the first embodiment of the FIGS. 1 to 6 may profit from this perfecting of the battery housing 4 (41, 42 respectively).

The invention is not restricted to the embodiments described above as various other variants which have not all been described fall within grasp of a person of ordinary skill in the art.

Notably for the two embodiments described above, the rotary slewing capacity of the battery compartment relative to the housing could be found at a side edge on the back of the housing instead of the lower edge on the back and one could even consider placing two cylinders or two hollow bodies one on either side edge on the back.

As regards the first embodiment, the cylinder may also be realized by a single cylindrical part having pins at its ends and around which the conducting bushes 14 are slid.

For each of the two embodiments described it is also possible to consider combining the properties of catch and properties of electrical contact of the pins 11 provided that there are as many metallic pins or metallized pins as there are contacts to be realized (typically 4) and that the holes 9 acting as female terminals are also metallized and electrically connected to the bushes 14 or to the tracks 24.

We claim:

1. A portable electronic device with battery power supply, formed by a housing holding electronic circuits, a separable battery compartment including a battery and connection means for electrically connecting said electronic circuits to said battery, these means being designed to enable the simultaneous connection of at least two batteries, characterized in that said connection means form a separate interface between said housing and said compartment, in that plug-in means are provided for simultaneously attaching at least two compartments firmly against said connection means and in that pivoting means are provided on said housing to enable at least a sectorial rotation of said connection means and of said compartment(s) which is (are) plugged into the connection means to said housing.

2. A portable electronic device as claimed in claim 1, formed by a portable radio communication device or mobile.

3. A portable electronic device as claimed in claim 1, characterized in that the connection means are formed by a cylinder with alternate insulating rings and conductors, rotatably mounted against an edge of the housing and which co-operates by its conducting rings with sliding electrical contacts slightly protruding to the exterior of the housing and of the compartment(s).

4. A portable electronic device as claimed in claim 1, characterized in that said connection means are formed by a hollow cylindrical body rotatably mounted against an edge of said housing, having a first longitudinal opening through which a flat cable of conductors runs coming from inside said housing across a second large enough opening made opposite the first opening in this housing at the location of said edge of said housing and in that said body has on the inside conducting tracks arranged around the circumference and having each at least two contacts showing through the surface at the location of openings intended to receive as electrical contacts contacts showing through the surface of the compartment and angularly substantially less than 90 degrees apart.

5. A portable electronic device as claimed in claim 4, characterized in that said first opening has lips which penetrate into said second opening and which serve as internal stops against walls of said housing.

6. A portable electronic device as claimed in claims 1, characterized in that said edge is the lower edge on the back of said housing.

7. A portable electronic device as claimed in claims 1, characterized in that each battery compartment comprises at least a diode for preventing the discharge of a battery into another battery during the time when two battery compartments are simultaneously put into said device.

8. A battery compartment intended for a portable electronic device as claimed in claim 1, characterized in that it comprises plug-in means for firmly attaching said compartment to said connection means designed for enabling the rotating electronic connection of said compartment to said housing.

9. A housing intended for a portable electronic device as claimed in one of the claims 1 to 7, characterized in that it comprises, pivotally mounted, said connection means designed for enabling the rotating electronic connection of said compartment to said housing and in that said connection means have holes for receiving said plug-in means of said battery compartment.

* * * * *